US009612660B2

United States Patent
Drescher et al.

(10) Patent No.: US 9,612,660 B2
(45) Date of Patent: Apr. 4, 2017

(54) INNOVATIVE KNOB WITH VARIABLE HAPTIC FEEDBACK

(71) Applicant: Continental Automotive Systems, Inc., Auburn Hills, MI (US)

(72) Inventors: Susan Adelle Drescher, Bloomfield Hills, MI (US); Tejas Bhupendra Desai, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/584,030

(22) Filed: Dec. 29, 2014

(65) Prior Publication Data

US 2016/0187975 A1 Jun. 30, 2016

(51) Int. Cl.
*G06F 3/045* (2006.01)
*G06F 3/01* (2006.01)
*G06F 3/044* (2006.01)
*G06F 3/0362* (2013.01)

(52) U.S. Cl.
CPC ............ *G06F 3/016* (2013.01); *G06F 3/0362* (2013.01); *G06F 3/044* (2013.01)

(58) Field of Classification Search
CPC ........ G06F 3/016; G06F 3/0362; G06F 3/044; G06F 2203/015
See application file for complete search history.

(56) References Cited

U.S. PATENT DOCUMENTS

| 5,936,613 A * | 8/1999 | Jaeger | G06F 3/0238 345/172 |
| 2008/0165141 A1* | 7/2008 | Christie | G06F 3/044 345/173 |
| 2008/0211779 A1* | 9/2008 | Pryor | G01C 21/3664 345/173 |
| 2008/0238879 A1* | 10/2008 | Jaeger | G06F 3/03545 345/173 |
| 2010/0013613 A1* | 1/2010 | Weston | G06F 3/041 340/407.2 |
| 2010/0201893 A1* | 8/2010 | Pryor | B60K 35/00 348/744 |
| 2010/0265201 A1* | 10/2010 | Oh | G06F 1/1626 345/173 |
| 2011/0261002 A1* | 10/2011 | Verthein | G06F 1/181 345/174 |
| 2012/0119997 A1* | 5/2012 | Gutowitz | G06F 3/0219 345/168 |
| 2012/0194457 A1* | 8/2012 | Cannon | A63F 13/02 345/173 |
| 2013/0015964 A1* | 1/2013 | Muller | H01H 25/06 340/459 |
| 2013/0057594 A1* | 3/2013 | Pryor | A63F 3/00643 345/690 |

(Continued)

*Primary Examiner* — Joe H Cheng

(57) ABSTRACT

A touch screen with haptic feedback knob arrangement. The arrangement includes an interactive surface having a controllable electrostatic pressure region across a portion of the interactive surface. The arrangement further includes a controller having an algorithm programmed thereon for controlling the amount of electrostatic pressure applied to the portion of the interactive surface where the electrostatic pressure region is located. A knob is rotatably mounted to the interactive surface and receives rotational resistance from the electrostatic pressure region of the interactive surface.

16 Claims, 2 Drawing Sheets

(56) References Cited

U.S. PATENT DOCUMENTS

| | | | |
|---|---|---|---|
| 2013/0100042 A1* | 4/2013 | Kincaid | G06F 3/016 345/173 |
| 2013/0120129 A1* | 5/2013 | Tippelhofer | B60Q 3/024 340/456 |
| 2014/0168132 A1* | 6/2014 | Graig | G06F 3/044 345/174 |
| 2014/0255614 A1* | 9/2014 | Myers | B05B 5/16 427/483 |

* cited by examiner

INNOVATIVE KNOB WITH VARIABLE HAPTIC FEEDBACK

FIELD OF THE INVENTION

The present invention relates to a vehicle touch screen with haptic feedback knob arrangement connected to the touch screen.

BACKGROUND OF THE INVENTION

In the field of automotive vehicle interiors, currently there are several dials, rotary switches, or knobs developed that use encoders or mechanical detents to provide feedback to a user. Additionally there have been developments that provide displays or touch screens that allow a user to touch various icons and menus in order to control functions in the vehicle. The problem with mechanical detents is that they require extra components and omitting them does not allow a user to feel the rotation of the knob making it harder to determine how far the knob has been rotated without actually looking at the knob during rotation. With regard to touch screens, there is a similar problem in that it is difficult for a user to operate or select icons and menus on a touch screen without looking at the screen because there is often no feel for the movement of a finger on the touch screen. The present invention seeks to simplify the use of mechanical detents and provide a knob configuration connectable to a touch screen that provides haptic feedback, similar to a mechanical type of knob arrangement to allow for a user to feel certain detents or stops as the knob is rotated. Additionally, the present invention is directed to an arrangement that eliminates or reduces the number of components necessary in order to create an arrangement using traditional knobs and touch screens, by providing a simple lower cost, less complicated arrangement.

SUMMARY OF THE INVENTION

The subject invention relates to a touch screen with haptic feedback knob arrangement that includes an interactive surface having a controllable electrostatic pressure region across a portion of the interactive surface. The arrangement further includes a controller having an algorithm programmed thereon for controlling the amount of electrostatic pressure applied to the portion of the interactive surface where the electrostatic pressure region is located. A knob is rotatably mounted to the interactive surface and receives rotational resistance from the electrostatic pressure region of the interactive surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
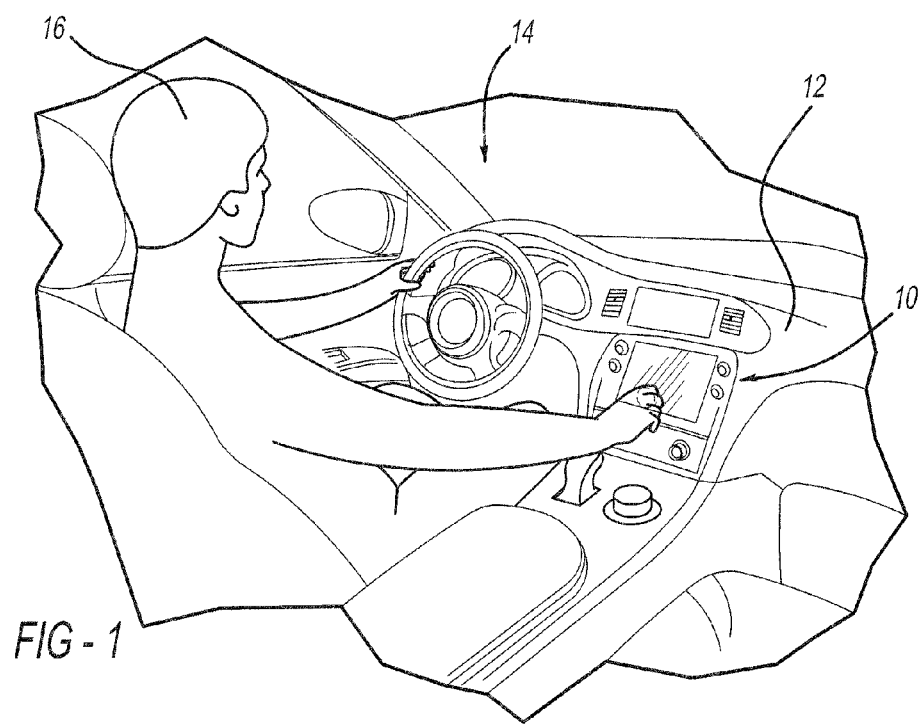
FIG. 1 is an environmental view of the touch screen with haptic feedback knob arrangement in accordance with one embodiment of the invention, incorporating the arrangement in the interior of a vehicle.

Referring now to all the drawings, with particular reference to FIG. 1, a touch screen with haptic feed back knob arrangement 10 is shown connected to an instrument panel console 12 on an interior of a vehicle 14. The touch screen haptic feedback knob arrangement 10, as shown in FIG. 1, is configured to be operated by a person 16, which in the present embodiment of the invention shown in FIG. 1 is a driver seated in the vehicle 14 interior. The touch screen with haptic feedback knob arrangement 10 used in the present embodiment of the invention can be used for any type of vehicle interface, including, but not limited to vehicle infotainment systems, sound radio systems, environmental HVAC systems, communications, driver interface modules, global positioning systems, vehicle lighting, vehicle audio, or virtually any other type of system in a vehicle. It is also within the scope of this invention for the touch screen with haptic feedback knob arrangement 10 to be located at another location and be operated by a person other than a driver. For example, the arrangement 10 could be located in an area where it could be reached an operated by a passenger of a vehicle, seated to the right of the driver. It is also within the scope of this invention for the arrangement the touch screen with haptic feedback knob arrangement 10 to be located in the rear seat area of the vehicle compartment allowing for passengers seated behind the driver to operate the arrangement.

Figure 2:
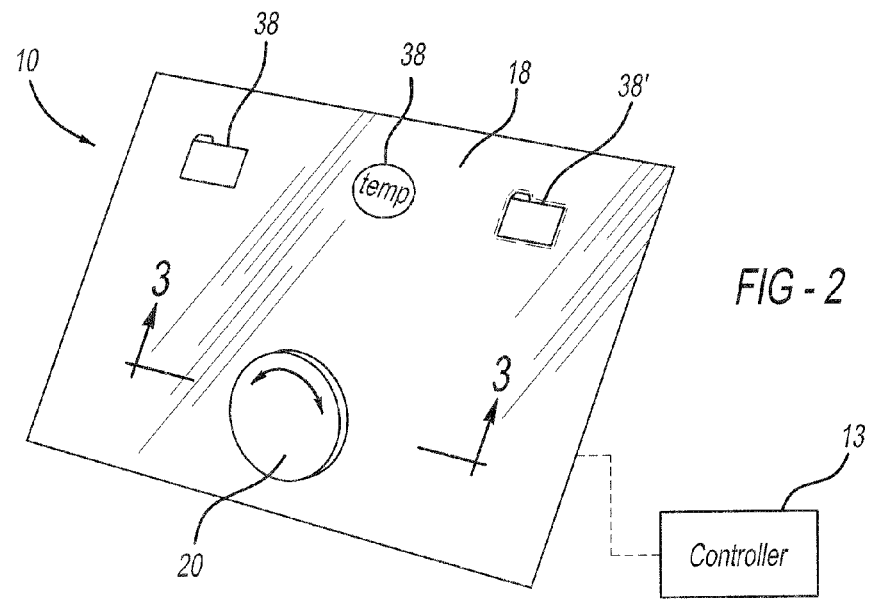
FIG. 2 is a perspective front view of the touch screen with haptic feedback knob arrangement.
Figure 3A:
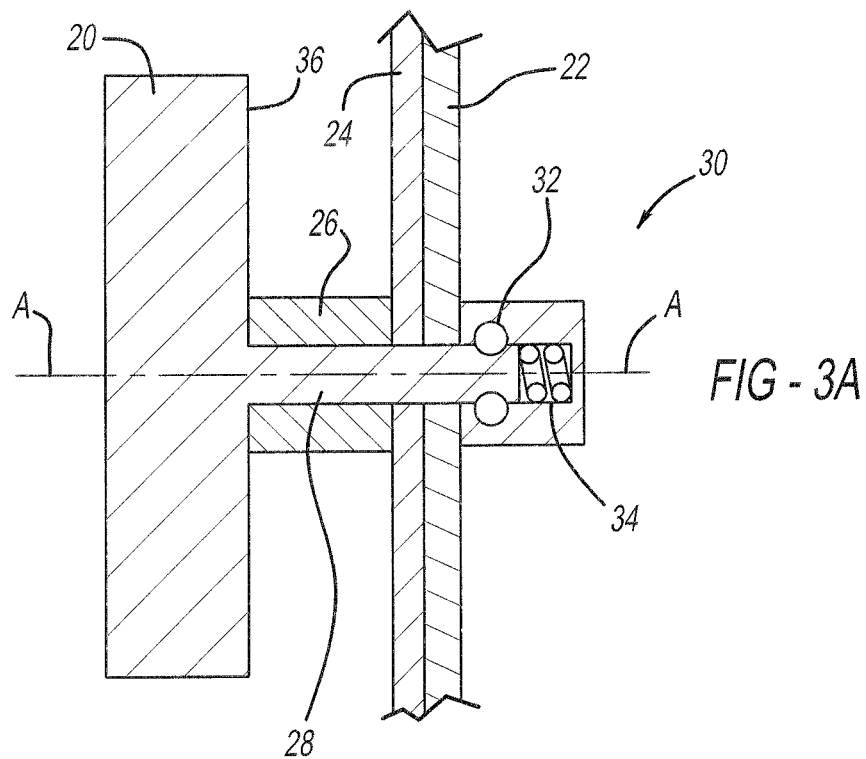
FIG. 3a is a cross-sectional plan view of the touch screen with haptic feedback knob arrangement in accordance with one embodiment of the present invention.

Referring now to FIG. 2, a close-up view of the touch screen with haptic feedback knob arrangement 10 is shown and includes an interactive surface 18 and a knob 20, which is rotatable. FIG. 3a shows one embodiment of the present invention, where the interactive surface 18 includes a glass or polymer surface 22 with a capacitive film 24 connected to the glass or polymer surface 22. The interactive surface 18 can be used to electronically display one or more icons 38 including a highlighted icon 38'. The icons 38 and highlighted icons 38' can take many different forms including, but are certainly not limited to temperature icons, file folders or numbers, or any other icon having any type of shape, color, or lettering. The information or icons displayed on the interactive display 18 are electronically controlled by a controller 13 that is used to display the icons 38, 38' as well as control the amount of electrostatic pressure provided by the capacitive film 24, 24' and receive signals from the capacitive film 24, 24', which can be done by a user touching a touch screen or by the interaction of the user 16 with the knob 20.

In the embodiment shown in FIGS. 2 and 3a, the capacitive film 24 is connected over the entire interactive surface 18 thereby providing an electrostatic pressure region across the entire interactive surface so that the entire interactive surface 18 is a touch screen that can be interacted with by the person 16 touching the screen with their fingers in addition to turning the knob 20. In the embodiment shown in FIG. 3b, there is no touch screen, and instead only the knob 20 interacts with an electrostatic pressure region formed across the polymer film 24' that does not cover the entire interactive surface.

Figure 3B:
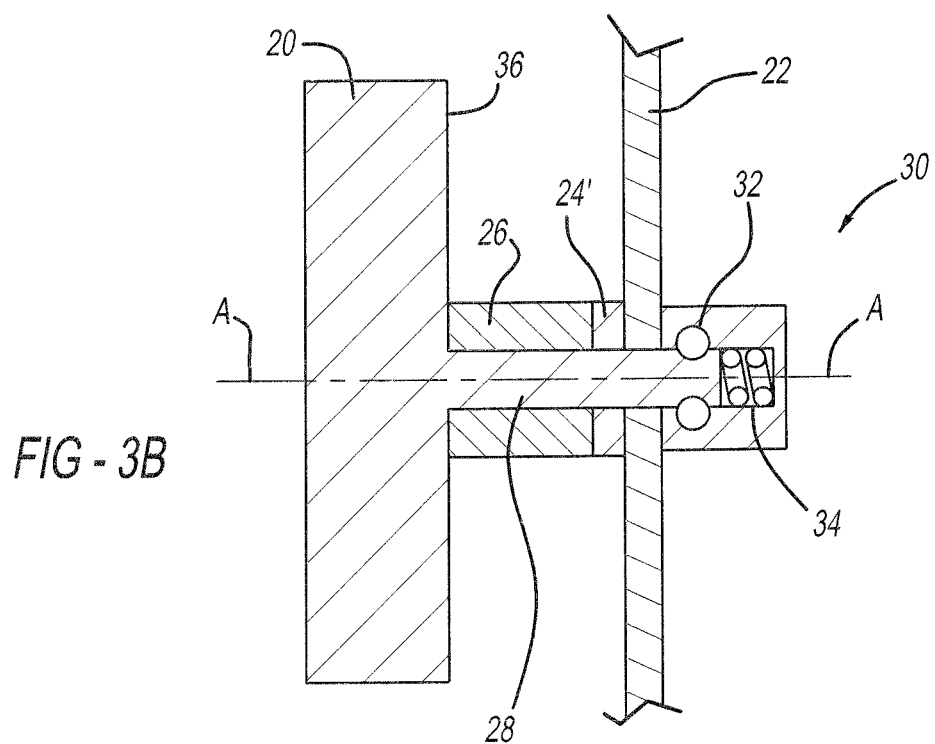
FIG. 3b is a cross-sectional plan view of the touch screen with haptic feedback knob arrangement in accordance with a second embodiment of the invention.

Both FIGS. 3a and 3b show the knob 20 having a stem 28 that extends through the interactive surface 18 and is connected to a point 30, which is a holder that contains bearings 32 disposed about the stem 28 and a spring 34 operably connected to the stem 28. The point 30 allows for the knob 20 to be rotated about the axis A-A of the stem 28. The spring 34 allows for the knob 20 to be depressed so that the knob 20 will move along the axis of the stem 28 in order to provide a push-button type option or feel to the knob 20. In addition to being able to move axially, the knob 20 can be rotated and the back side 36 of the knob 20 has the interface 26 connected thereon. The interface 26 may be integrally formed with the knob 20 or may be a separate component. The interface as shown in the embodiment in FIGS. 3a and 3b is a metallic collar that is in contact with the capacitive film 24, 24' in order to interact with and transmit electrostatic pressure from the capacitive film 24, 24' to the knob 20. The transmitted electrostatic pressure can be used to create a virtual detent, which is an electrostatic pressure being transmitted to the knob 20 during rotation, which to the user feels like a mechanical detent, bump or ridge as the knob 20 turns. It is possible for the virtual detent to be any other type of feeling or sensation that can be applied by the interaction of the interface 26 with the capacitive film 24, 24'. Additionally, the interface 26 can be pressed with greater pressure onto the capacitive film 24, 24' when the knob 20 is pressed by the user in the axial direction, so as to compress the spring 34 contained within the holder or point 30. The spring 34 will cause the knob 20 to return to its original axial position when the knob 20 is no longer being pressed in the axial direction by the user.

With regard to the virtual detents, the rotational interaction of the interface 26 of the knob 20 with respect to the capacitive film 24, 24' may be controlled by the controller 13 which controls the amount of electrostatic pressure applied to the capacitive film 24, 24'. During rotation of the knob 20, the rotational resistance is proportional to the amount of electrostatic pressure applied to the captive film 24, 24' and transmitted to the interface 26 or collar to control the rotational resistance. The controller 13 controls the amount of electrostatic pressure within the capacitive film 24, 24'. The controller 13 can also vary the amount of electrostatic pressure transmitted to the interface 26 to create rotational resistance of the knob 20 that feels like a build-up of force until the knob 20 rotates to a predetermined position or distance, and then the controller 13 causes the force build-up to drop very low and then begin to move or build up to a very high degree of electrostatic pressure when a second predetermined position is reached, thereby causing the rotation of the knob 20 to feel like there are detents, bumps or ridges being encountered as the knob 20 rotates. This is one example of what is considered to be a virtual detent in accordance with the present invention because the knob 20 is not mechanically encountering any mechanical detents or ridges as it rotates, but instead the feeling of the virtual detent is accomplished using electrostatic pressure being transmitted to the interface 26 through the capacitive film 24, 24'.

With regard to another aspect of the invention shown in FIGS. 2 and 3a, the interactive surface 18 has the capacitive film 24 across its entire surface to create a touch screen viewing surface. The interactive surface 18 as shown in FIG. 2 shows icons 38, where one of the icons is a highlighted icon 38'. The user 16 can create a highlighted icon 38' by simply touching the icon 38 causing it to be highlighted. Depending on how the arrangement 10 is configured, the highlighting of the icon brings up a second menu or a scale, such as for example, a scale indicating HVAC fan speed, and then the user 16 turns the knob 20 to control the fan speed of the HVAC system. In the embodiment of the invention shown in FIG. 3b, the capacitive film 24' does not extend across the entire interactive surface, therefore the user must turn the knob 20 to highlight a selected or highlighted icon 38', and then select the highlighted icon by pressing the knob 20 axially causing the interface 26 of the knob to interact with the capacitive film 24' which is part of the touch screen surface on the second embodiment shown in FIG. 3b. Once the knob 20 has been pressed, the user may then adjust or select different options by rotating the knob 20. For example, with regard to an HVAC system, the user 16 may then turn the knob 20 in order to control fan speed, temperature, or other variables.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A touch screen with a haptic feedback knob arrangement comprising:
   an interactive surface with a glass or polymer surface having a capacitive film attached to the glass or polymer surface, said capacitive film provides a controllable electrostatic pressure region across a portion of the interactive surface;
   a controller with an algorithm programmed thereon for controlling the amount of electrostatic pressure applied to said portion of said interactive surface; and
   a knob rotatably mounted to the interactive surface and having an interface in contact with the capacitive film, wherein the rotational resistance is proportional to the amount of electrostatic pressure provided by the capacitive film and transmitted to the interface to control the rotational resistance of the knob.

2. The touch screen with haptic feedback of claim 1 wherein the interface is a collar extending from a back surface of the knob and extending to and contacting the capacitive film.

3. The touch screen with haptic feedback arrangement of claim 2 wherein said rotational resistance creates one or more virtual detents as said knob rotates.

4. The touch screen with haptic feedback of claim 1 wherein the amount of electrostatic pressure transmitted to the interface is varied to create rotational resistance of the knob that is a build-up of force until the knob rotates to a predetermined position causing the force build up to drop very low and move very high when a second predetermined position is reached.

5. The touch screen with haptic feedback knob arrangement of claim 1 wherein a portion of the interactive surface is a touch screen viewing surface that displays icons to a person and said icons can be selected when the person touches one or more of the icons on the touch screen viewing surface.

6. The touch screen with haptic feedback knob arrangement of claim 5, wherein the selection of one of the icons displays selectable parameters that are changed by rotating the knob.

7. The touch screen with haptic feedback knob arrangement of claim 1 wherein said knob is axially movable in a direction perpendicular to the rotation of the knob and a portion of the interactive surface displays icons to a person and one or more of said icons are selected by rotating the knob to highlight one of the icons and then moving the knob axially to select a highlighted icon, which then causes additional information to be displayed on the interactive surface.

8. A touch screen with a haptic feedback knob arrangement comprising:
- an interactive surface with a glass or polymer surface having a capacitive film attached to the glass or polymer surface, said capacitive film provides a controllable electrostatic pressure region across a portion of the interactive surface;
- a controller with an algorithm programmed thereon for controlling the amount of electrostatic pressure applied to said portion of said interactive surface;
- a knob rotatably mounted to the interactive surface and having an interface including a collar extending from a back surface of the knob and extending to and contacting the capacitive film, wherein the rotational resistance is proportional to the amount of electrostatic pressure provided by the capacitive film and transmitted to the interface to control the rotational resistance of the knob; and
- a stem of the knob extending through the collar and the stem extends through the interactive surface and is connected to a point behind the interactive, wherein said stem is rotatably connected to the point being the interactive surface and is also configured to move axially along the stem at the point.

9. The touch screen with haptic feedback of claim 8 wherein the amount of electrostatic pressure transmitted to the interface is varied to create rotational resistance of the knob that is a build-up of force until the knob rotates to a predetermined position causing the force build up to drop very low and move very high when a second predetermined position is reached.

10. The touch screen with haptic feedback arrangement of claim 9 wherein said rotational resistance creates one or more virtual detents as said knob rotates.

11. The touch screen with haptic feedback knob arrangement of claim 8 wherein a portion of the interactive surface is a touch screen viewing surface that displays icons to a person and said icons can be selected when the person touches one or more of the icons on the touch screen viewing surface.

12. The touch screen with haptic feedback knob arrangement of claim 11, wherein the selection of one of the icons displays selectable parameters that are changed by rotating the knob.

13. The touch screen with haptic feedback knob arrangement of claim 8 wherein said knob is axially movable in a direction perpendicular to the rotation of the knob and a portion of the interactive surface displays icons to a person and one or more of said icons are selected by rotating the knob to highlight one of the icons and then moving the knob axially to select a highlighted icon, which then causes additional information to be displayed on the interactive surface.

14. A touch screen with a haptic feedback knob arrangement comprising:
- an interactive surface having a controllable electrostatic pressure region across a portion of the interactive surface;
- a controller with an algorithm programmed thereon for controlling the amount of electrostatic pressure applied to said portion of said interactive surface; and
- a knob rotatably mounted to the interactive surface, wherein the knob receives a rotational resistance from the electrostatic pressure region of the interactive surface, wherein:
  (i) the knob has an interface in contact with the interactive surface, wherein the rotational resistance is proportional to the amount of electrostatic pressure applied to said interactive surface and transmitted to the interface to control the rotational resistance; and
  (ii) the amount of electrostatic pressure transmitted to the interface is varied to create rotational resistance of the knob that is a build-up of force until the knob rotates to a predetermined position causing the force build up to drop very low and the pressure begins to build up again to a high point when a second predetermined position is reached.

15. A touch screen with a haptic feedback knob arrangement comprising:
- an interactive surface having a controllable electrostatic pressure region across a portion of the interactive surface;
- a controller with an algorithm programmed thereon for controlling the amount of electrostatic pressure applied to said portion of said interactive surface; and
- a knob rotatably mounted to the interactive surface, wherein the knob receives a rotational resistance from the electrostatic pressure region of the interactive surface,
- wherein the interactive surface includes a glass or polymer surface with a capacitive film attached to the interactive surface at least in the region of where an interface of the knob contacts the interactive surface, and the interface of the knob will be in contact with the capacitive film.

16. A touch screen with a haptic feedback knob arrangement comprising:
- an interactive surface having a controllable electrostatic pressure region across a portion of the interactive surface;
- a controller with an algorithm programmed thereon for controlling the amount of electrostatic pressure applied to said portion of said interactive surface; and
- a knob rotatably mounted to the interactive surface, wherein the knob receives a rotational resistance from the electrostatic pressure region of the interactive surface,
- wherein said knob is axially movable in a direction perpendicular to the rotation of the knob and a portion of the interactive surface displays icons to a person and one or more of said icons are selected by rotating the knob to highlight one of the icons and then moving the knob axially to select a highlighted icon, which then causes additional information to be displayed on the interactive surface.

* * * * *